US010380568B1

(12) United States Patent
Rogers et al.

(10) Patent No.: US 10,380,568 B1
(45) Date of Patent: Aug. 13, 2019

(54) ACCESSING RIGHTS-MANAGED CONTENT FROM CONSTRAINED CONNECTIVITY DEVICES (75) Inventors: Kenneth Allen Rogers, Hudson, MA (US); Allen D. Hadden, Marlborough, MA (US); Peter J. Thompson, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 2606 days.

(21) Appl. No.: 11/480,300

(22) Filed: Jun. 30, 2006

Related U.S. Application Data (60) Provisional application No. 60/752,264, filed on Dec. 20, 2005.

(51) Int. Cl.
*G06Q 20/12* (2012.01)
(52) U.S. Cl.
CPC ................ *G06Q 20/1235* (2013.01)
(58) Field of Classification Search
CPC .................................. G06Q 20/1235
USPC ...................................... 705/50–79
See application file for complete search history.

(56) References Cited

U.S. PATENT DOCUMENTS

| | | | | |
|---|---|---|---|---|
| 5,629,980 A * | 5/1997 | Stefik et al. | | 705/54 |
| 5,765,152 A * | 6/1998 | Erickson | | G06F 21/10 |
| 6,226,618 B1 * | 5/2001 | Downs | | G06F 21/10 |
| | | | | 380/279 |
| 6,289,450 B1 * | 9/2001 | Pensak | | H04L 63/0428 |
| | | | | 713/167 |
| 6,484,182 B1 * | 11/2002 | Dunphy et al. | | 705/26 |
| 6,550,011 B1 * | 4/2003 | Sims, III | | 713/193 |
| 6,961,641 B1 | 11/2005 | Forth et al. | | |
| 6,978,376 B2 | 12/2005 | Giroux et al. | | |
| 7,395,244 B1 * | 7/2008 | Kingsford | | 705/52 |
| 7,523,071 B2 * | 4/2009 | Fox et al. | | 705/52 |
| 2002/0077985 A1 * | 6/2002 | Kobata et al. | | 705/51 |

(Continued)

OTHER PUBLICATIONS

Internet Archive Wayback Machine archive of "mVideoGuard Mobile DRM Solutions: Securing content, building revenues". Archived Dec. 8, 2004, available at <http://web.archive.org/web/20041208121857/www.nds.com/mobile_solutions/mobile_drm_solutions.html>.*

(Continued)

*Primary Examiner* — Jacob C. Coppola
(74) *Attorney, Agent, or Firm* — Dergosits & Noah LLP; Todd A. Noah (57) ABSTRACT

A DRM system is provided wherein when a protected content unit is provided to an access device, the access information associated with the protected content unit is retrieved from the DRM server and provided to the access device in the same transaction in which the protected content unit is provided. Therefore, when the user seeks to access the protected content unit, the access request can be handled locally without the need to rely upon potentially constrained connectivity to the DRM server. The techniques described herein enable an access device to access content protected by a DRM system. When a protected content unit and access information is received at the access device, in one transaction, the protected content unit can be decrypted on the access device using the access information, and/or the access information can be used to enforce a DRM policy associated with the protected content unit.

12 Claims, 7 Drawing Sheets

(56) References Cited

U.S. PATENT DOCUMENTS

| | | | |
|---|---|---|---|
| 2002/0077986 A1* | 6/2002 | Kobata et al. | 705/52 |
| 2002/0082997 A1* | 6/2002 | Kobata | G06F 21/10 705/51 |
| 2002/0157002 A1* | 10/2002 | Messerges et al. | 713/155 |
| 2002/0198846 A1* | 12/2002 | Lao | G06F 21/10 705/54 |
| 2004/0039916 A1* | 2/2004 | Aldis | G06F 21/10 713/177 |
| 2004/0103312 A1* | 5/2004 | Messerges et al. | 713/201 |
| 2004/0117197 A1* | 6/2004 | Dutta | G06Q 20/1235 705/52 |
| 2005/0004875 A1* | 1/2005 | Kontio et al. | 705/52 |
| 2005/0038750 A1* | 2/2005 | Cahill et al. | 705/59 |
| 2005/0086501 A1* | 4/2005 | Woo | G06F 21/10 713/189 |
| 2005/0091173 A1* | 4/2005 | Alve | 705/71 |
| 2005/0097359 A1* | 5/2005 | Speare et al. | 713/201 |
| 2005/0216548 A1* | 9/2005 | Wormington et al. | 709/201 |
| 2005/0246541 A1* | 11/2005 | Ginter et al. | 713/176 |
| 2006/0080740 A1* | 4/2006 | Bremer et al. | 726/26 |
| 2006/0230266 A1* | 10/2006 | Maes | 713/168 |
| 2007/0074270 A1* | 3/2007 | Meehan et al. | 726/2 |

OTHER PUBLICATIONS

Internet Archive Wayback Machine archive of "mVideoGuard Handset DRM Client". Archived Dec. 15, 2004, available at <http://web.archive.org/web/20041215021733/www.nds.com/mobile_solutions/mvideoguard_client.html>.*

Internet Archive Wayback Machine archive of "mVideoGuard DRM Server". Archived Dec. 15, 2004, available at <http://web.archive.org/web/20041215023603/www.nds.com/mobile_solutions/mvideoguard_server.html>.*

Internet Archive Wayback Machine archive of "mVideoGuard Highlights". Archived Dec. 15, 2004, available at <http://web.archive.org/web/20041215022100/www.nds.com/mobile_solutions/mvideoguard_highlights.html>.*

OMA Mobile Email Requirements—Draft Version 1.0—Sep. 29, 2005. Acquired from <https://datatracker.ietf.org/documents/LIAISON/file205.doc>.*

OMA DRM Specification V2.0—Draft Version 2.0—Apr. 20, 2004.*

U.S. Appl. No. 11/479,119, filed Jun. 30, 2006, Kenneth Allen Rogers et al. Allen D. Hadden Peter J.Thompson.

U.S. Appl. No. 11/479,120, filed Jun. 30, 2006, Kenneth Allen Rogers et al. Allen D. Hadden Peter J. Thompson.

* cited by examiner

ACCESSING RIGHTS-MANAGED CONTENT FROM CONSTRAINED CONNECTIVITY DEVICES

RELATED APPLICATIONS

This application claims priority under 35 U.S.C. § 119(e) to U.S. Provisional Application Ser. No. 60/752,264, entitled "ACCESSING RIGHTS-MANAGED CONTENT FROM CONSTRAINED DEVICES," filed on Dec. 20, 2005, which is incorporated herein by reference in its entirety.

FIELD OF THE INVENTION

The present application relates to digital rights management systems for managing access to digital content (e.g., documents, video, audio, email, and other content).

BACKGROUND OF INVENTION

Digital rights management systems exist that control access to digital content. An access control policy can control, for example, which users may access particular units of content, when particular users may access particular content, from what devices particular users may access protected content, what particular users may do with that content (e.g., read, modify, copy, save, print), and whether particular users may be limited to accessing content having a watermark rendered over it (e.g., by physically printing a watermark when a document is printed, by applying a watermark on a display screen when a document is displayed, etc.) or not.

Figure 1:
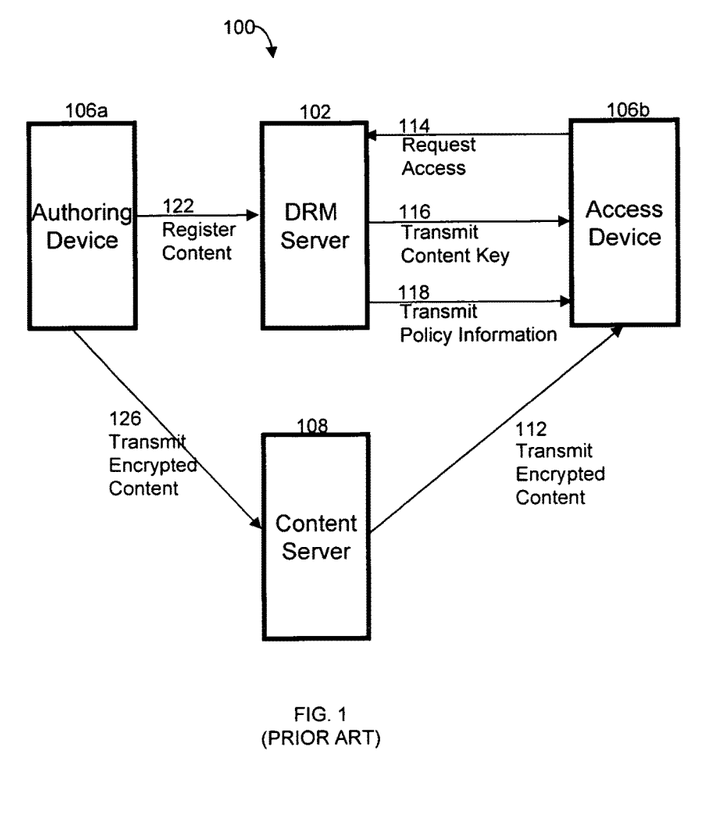
FIG. 1 is a block diagram of a prior art digital rights management system.

FIG. 1 is a block diagram of an illustrative prior art digital rights management (DRM) system 100 that includes a DRM server 102, an authoring device 106a, an access device 106b, and a content server 108. Numerous types of electronic content may be managed using the DRM system 100. Examples include word processing documents, formatted documents (e.g., PDF documents), spreadsheets, video files, audio files, image files, email messages, and/or other types of electronic content. Each type of content may be created and/or viewed by one or more particular types of application programs. An example of such a DRM system is described in, for example, U.S. Pat. No. 6,978,376, entitled "INFORMATION SECURITY ARCHITECTURE FOR ENCRYPTING DOCUMENTS FOR REMOTE ACCESS WHILE MAINTAINING ACCESS CONTROL," filed on Dec. 15, 2000, which is incorporated herein by reference in its entirely.

The DRM scheme implemented by system 100 encrypts protected content to prevent unauthorized access. The DRM scheme further implements a scheme to ensure that only authorized users gain access to the information necessary to decrypt the protected content, and only in a manner that enables each user to access the content and perform the actions with that content that they are authorized to perform consistent with the access control policy for that content.

DRM server 102 performs several functions associated with the digital rights management of protected content. An encryption key is generated (e.g., by the DRM server, the authoring device or otherwise). The DRM server 102 maintains decryption keys for protected content (also referred to as content "registered" with the DRM system), maintains decryption keys for registered encrypted content, authenticates requests for viewing registered content, and grants access to registered content by providing decryption keys and associated access policies to authorized users. The DRM server may maintain a secure central database which provides an association between registered users that created or authored the registered content, the registered content, decryption keys for the registered content, access policies for the registered content, and registered users authorized to access each unit of protected content.

Content server 108 may generate and/or store units of content that may be managed by the DRM system. Content server 108 may have one or more application programs to generate various types of content (e.g., an email exchange server application, a word processing application, an image generation application, etc.). Content on content server 108 may be created and/or modified in response to user actions on an authoring device (e.g., authoring device 106a). A software plugin (not shown) for the DRM system may be installed on the authoring device and may allow the selection of an option to protect a unit of content (e.g., a word processing document) when it is opened or created on the access device in response to a user's actions. The plugin can connect to the DRM server over a secure communication link (e.g., via an SSL connection), and the user can be authenticated by the DRM server through a user interface presented by the plugin. The DRM server may connect to one or more resources in a networked computer system (e.g., a directory service storing authentication information such as a user name and password), so that the user may be authenticated based upon information provided via the plugin user interface, to the DRM server.

Once authenticated, the DRM user interface allows the authenticated user to set a policy to protect the document. The user may select a pre-defined policy or create a new one. The policy may specify any of the control criteria discussed above (e.g., which user(s) may access the document, when the document may be accessed, from where the document may be accessed (e.g., only local network access), what actions may be performed with the document (e.g., printing, copying, modifying), whether a watermark should be applied to the document, etc.).

A unique identifier is created for the content (e.g., by applying a hashing algorithm to the content), in association with a request to register the content with the DRM server that is sent 122 by the authoring device 106a. In response, a content encryption key is generated. The content is encrypted using the content encryption key and sent 126 to the content server 108 where it is stored along with the unencrypted unique identifier for the content, and an unencrypted address for the DRM server 102. The DRM server 102 stores the policy and the content encryption key, and associates them with the content via the unique identifier for the content in any suitable way. In one embodiment, the unique identifier and the unencrypted address of the DRM server may be embedded in the content (e.g., in an unencrypted portion of the content).

When a user attempts to access the protected content using an access device 106b, the encrypted content is transmitted 112 from the content server 108 to the access device 106b, along with the unencrypted address of the DRM server 102 and the unencrypted unique identifier for the content. The access device can then use the unencrypted address of the DRM server to request access to the protected content associated with the unique content identifier, as described further below.

Access device 106b is a device through which a user may seek to access a protected unit of content. For example, if the content server 108 is a word processing server, a user may attempt to access a protected word processing document on the word processing server via an access device (e.g., a workstation). The protected unit of content may be transmitted 112 from the content server 108 to the access device 106b (e.g., via a network connection). As discussed above, the protected content is encrypted, so that the user utilizing the access device 106b cannot access it without authority granted by the access policy that is associated with the protected unit of content and is stored on the DRM server 102.

When a user on access device 106b seeks access to a protected content unit, it can only gain access by retrieving the content key from the DRM server 102. If the access device 106b has a DRM plugin installed, the plugin issues a communication 114 to the DRM server 102 (e.g., using the address associated with the content) to request access to the protected unit of content. If no plugin is installed, information within the content may point the device to a server from which the DRM plugin may be installed. The DRM server 102 determines whether the user using the access device 106b is authorized to access the specified unit of content. If not, the access request is denied. If the user is authorized, the content decryption key is transmitted 116 from the DRM server 102 to the access device 106b. This content key may be encrypted using a communication session key for the transaction between the access device and the DRM server so as to keep it secure. The content key may be used to decrypt the unit of content so as to generate a decrypted unit of content which may be accessed by the user. However, the DRM server 102 further transmits 118 policy information to the access device, which dictates the actions the user may perform on the unit of content. The DRM software plugin installed on the access device enforces the policy.

BRIEF DESCRIPTION OF DRAWINGS

In the drawings, in which like reference numerals represent like elements.

DETAILED DESCRIPTION

Applicants have appreciated that DRM systems such as the system discussed above rely upon the availability of a reliable and fast network connection between the accessing device(s) and the DRM server. As discussed above, when an access device attempts to access a piece of content protected by the DRM system, a network connection session is opened between the access device and the DRM server and several communications are passed back and forth between them. For example: (1) handshakes are exchanged to register a session key for securely transmitting information during the session; (2) the access device requests access to the protected content; and (3) the DRM server transmits a content decryption key and policy information for the protected content to the access device.

Applicants have further appreciated that it may be desirable to enable content protected by a DRM system to be accessed by an access device with an ability to access the DRM system only via network connectivity that is constrained in that it is so unreliable, slow, not always available, or of such high latency that gaining access to protected content using the techniques of conventional DRM systems would result in a poor user experience. An example of a class of such devices are those that rely exclusively on wireless connections (e.g., PDAs, pagers, wireless phones, remote email messenger devices). In view of the foregoing, techniques are described herein for enabling protected content to be accessed via a device having constrained network connectivity.

In one embodiment, when a protected content unit is provided to an access device, the access information associated with the protected content unit is retrieved from the DRM server and provided to the access device in the same transaction in which the protected content unit is provided. In one embodiment, the protected content unit and the associated access information can be provided to the access device proactively without the access device having to request access to the content. In one embodiment, the protected content and the associated access information may be provided to the access device in response to an event (e.g., protected content being provided to a server) other than a request to access the protected content via the access device. Therefore, when the user seeks to access the protected content unit, the access request can be handled locally without the need to rely upon potentially constrained connectivity to the DRM server. As used herein, the reference to the content and its associated access information being transmitted in a same transaction is intended to indicate that the access device need not request the access information for the content unit in a separate transaction, but that the access information be forwarded along with its associated content. The transaction in which the protected content unit and the access information is provided to the access device can include one or more transmissions. Thus, the transaction can include one transmission in which both the protected content unit and the access information are provided, can include one transmission in which the protected content unit is provided and a separate transmission in which the access information is provided, or can include any other number of transmissions whereby the protected content unit and the access information are both sent to the access device.

The techniques described herein enable an access device to access content protected by a DRM system. When a protected content unit and access information is received at the access device, in one transaction, the protected content unit can be decrypted on the access device using the access information, and/or the access information can be used to enforce a DRM policy associated with the protected content unit.

It, should be appreciated that the above-mentioned embodiments can be implemented in any way, as they are not limited to any particular implementation. Examples of specific implementations are discussed below, but it should be understood that these implementations are presented simply as illustrative examples, and the embodiments may be implemented in any other ways. The examples below are described for use in a DRM system that is similar in many respects to the system of FIG. 1 described above. However it should be appreciated that the techniques described herein can be used with DRM systems that are implemented in any of numerous ways, and are not limited to use with any particular type of DRM system.

As discussed below, one application for the techniques described herein is for use with a remote email access system that allows access to an email server via a portable wireless device (e.g., the BlackBerry™ solutions offered by Research In Motion Limited, hereafter "the Blackberry system"). However, this example is merely illustrative, as the techniques described herein can be used with any type of system wherein an access device has constrained network connectivity. In addition, as discussed in more detail below, it is further contemplated that the techniques described herein can further be employed advantageously in some systems wherein the access device has network connectivity that is not constrained.

Figure 2:
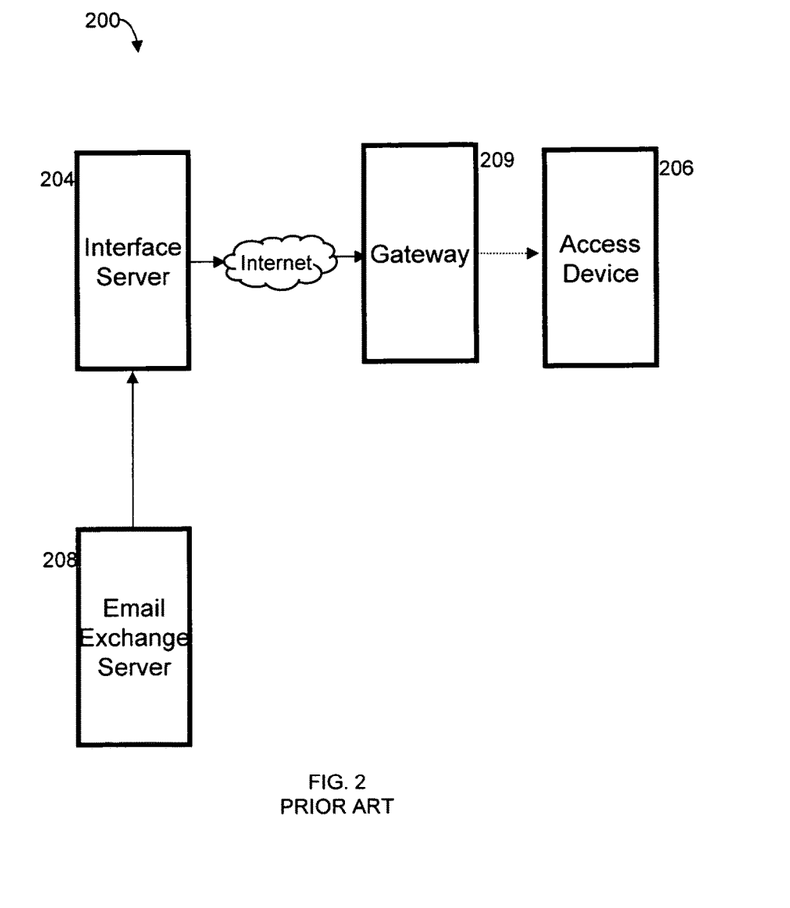
FIG. 2 is a block diagram of a remote email access system on which a DRM system can be employed.

FIG. 2 is a block diagram of an illustrative prior art email access system 200 on which an access device 206 (e.g., a mobile wireless device of the type used in the BlackBerry™ system) receives email messages from an email exchange server 208. The system 200 includes an interface server 204 (e.g., the Blackberry Enterprise Server™) which extracts from the email exchange server 208 email messages intended for the access device 206 and transmits the messages (e.g., via the Internet) to a gateway 209 which then transmits the email messages via a wireless signal to the mobile wireless access device 206. Network applications other than email can also be accessed via the access device 206, for example, via access to application servers and instant messaging servers (not shown), other than the email exchange server.

One aspect of the embodiments presented herein is directed to enabling protected content (e.g., email messages and/or attachments) to be accessed by a constrained access device, such as the wireless remote device used in the BlackBerry™ system. The remote access device in a remote email access system connects to other components in the system via a wireless connection to the gateway 209 and then via a connection (e.g., over the Internet) from the gateway to the interface server 204. Because of its reliance on a wireless network, the connection can be sporadic and unreliable depending on where the user is geographically located. The remote email access system is designed so that the user may use the remote access device even when no connection to the gateway is present, and the system can resynchronize once a connection is re-established. Applicants have appreciated that it is desirable to enable a user to access protected content via the remote device even when the connection to the gateway is not present at all, or when it is sporadically present.

In addition, even when a connection to the gateway is established, applicants have appreciated that the connection over the wireless network and through the gateway to the interface server may be of such low bandwidth and/or speed as to prevent the user from having a satisfactory experience if access to protected content required the type of communication with the DRM server discussed above in connection with the DRM system of FIG. 1. This can be exacerbated by the fact that the communication scheme employed by the BlackBerry™ system does not support an open connection between the wireless device and the DRM server so that a series of separate messages need to be employed. In view of the foregoing, a system that enables protected content (e.g., email messages and/or other attachments) to be accessed by a constrained access device, such as the wireless remote device used in the BlackBerry™ system, can facilitate the use of such constrained access devices to access content protected via a DRM system.

Figure 3:
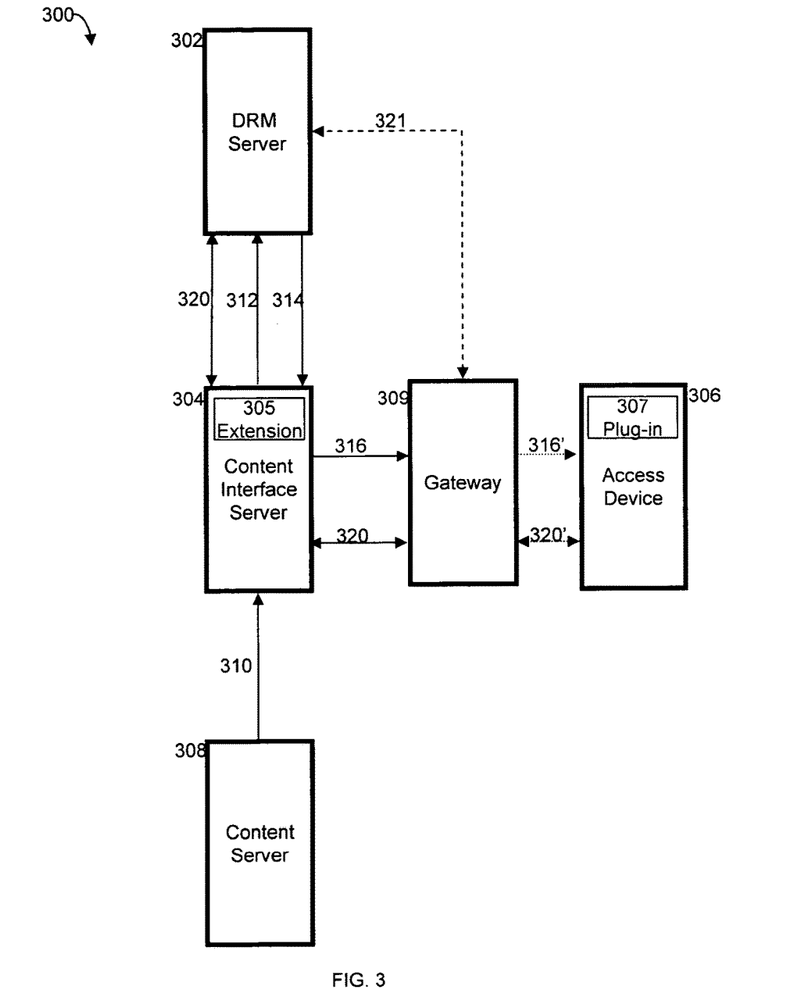
FIG. 3 is a block diagram of a digital rights management system in accordance with one embodiment.

FIG. 3 illustrates an exemplary DRM system 300 which can enable protected content to be accessed via a remote wireless device in an email access system, such as the BlackBerry™ system. To facilitate access to protected email messages and/or attachments, the DRM system may automatically and proactively send access information along with protected content to the remote access device (e.g., whenever the remote device synchronizes with the interface server). Therefore, the access device may receive protected email and/or attachments and associated access information without the access device having to request access to the protected email. When access to a protected email or attachment is desired, the remote access device can use the previously received access information to access the protected content without needing to rely on a network connection to access the DRM server. In this manner, the DRM system facilitates remote access of protected emails and/or other attachments using a constrained access device (e.g., a BlackBerry™ handheld device).

It should be appreciated that the techniques described herein may be used to enable access to any type of protected content via any type of constrained connectivity access device, and is not limited to use in a remote email access system, as the techniques described herein can be used in systems employing any type of content server handling any type of content that is accessible via any type of constrained device.

System 300 includes a content server 308, a wireless access device 306, a content interface server 304 to facilitate communication between the access device and the content server, and a gateway 309 to enable communication between the wireless access device and the interface server, much like the BlackBerry™ system. In addition, a DRM server 302 is provided to administer digital rights management for the content on the content server 308.

DRM server 302 may be any type of computer (e.g., like DRM server 102 of the DRM system 100) that is programmed to implement a DRM scheme and may be implemented on a computer dedicated exclusively to performing the functions of the DRM server or may be implemented on a computer that is also programmed to perform other functions. In one embodiment, the DRM server implements a DRM scheme similar to that discussed above in connection with FIG. 1. DRM server 302 may be responsible for managing content decryption keys and policies associated with the protected content. In some embodiments, the DRM server 302 stores and manages this information directly. Alternatively, the information managed by the DRM server may be stored on any other secure device accessible to the DRM server.

Content server 308 may be any type of computer that (much like the content server 108 of FIG. 1) has one or more applications executing thereon that generate, distribute and/or receive electronic content. In embodiments described in more detail below, the content server 308 is one or more email exchange servers (e.g., a network of email exchange servers), and the content may comprise email messages and attachments. However, it should be appreciated that the aspects of the present invention described herein are not limited to use with an email system, and can be used to enable access to any other type of protected content (including any of those described above) via a constrained device.

Interface server 304 serves as an interface between the access device 306 and content server 308. The interface server 304 may comprise any suitable server that has a processor programmed to manage the flow of content between the access device 306 and the content server 308.

Access device 306 may be any combination of software and hardware used to access and/or generate content, via the interface server, on the content server. Access device 306 may be a constrained device having unreliable or high latency network connectivity, such as wireless devices like cell phones, PDAs, email messengers (e.g. Blackberry™ devices), and/or pagers. In the remote email access example, the access device 306 may be a PDA or other device capable of viewing and generating email. As discussed above, in typical remote email access systems the access device is a wireless device that communicates with the interface server via a wireless connection, and can also be used when no connection is present and then resynchronize when a connection is reestablished. In some cases, a wireless connection may be intermittent and users may desire to access email "offline" when no connection is available (e.g., on a plane).

In accordance with one embodiment, when protected content is to be transmitted to a constrained device (e.g., access device 306) information sufficient to enable the access device to access the protected content is automatically retrieved from the DRM server and securely sent to the constrained access device. This information can include information enabling decryption of the protected content (e.g., a content decryption key) and policy information controlling access to the protected content. The constrained device can be provided with software to access the policy information and enforce it on the constrained device. The techniques can be implemented in any suitable way, and are not limited to any particular implementations described herein. One example will now be described for use with the remote email access system example, but it should be appreciated that this description is provided merely as an example, and numerous other implementations are possible.

In accordance with one embodiment, the DRM system is implemented in many ways similar to the system of FIG. 1, but components are added to the access device 306 and to the interface server 304 to implement the functionality discussed above to enable the access device 306 to access protected content. These components include a DRM plugin 307 on the access device and a DRM extension 305 on the interface server 304.

In one embodiment, initial configuration steps are performed to initialize parameters which may facilitate secure communication among the various components of the system. The steps used to facilitate secure communication may take any form, as the embodiments presented herein are not limited in any way to how the secure communication is established. For example, in one embodiment, one or more encryption keys are configured on various components to facilitate secure communication using any suitable technique. Furthermore, in an embodiment wherein the access device 306 is provided with the capability to communicate directly with the DRM server, as discussed below, the plugin 307 on the access device 306 may be configured with information that facilitates such communication (e.g., address/ports of the DRM server).

In the example of a remote email access system, the interface server 304 resides in the content distribution stream monitoring content on the content server 308 and directing content to the access device 306. For example, emails that relate to a particular user can be identified to be sent to that user's remote access device 306, and that content may be transmitted (arrow 310) by the content server 308 to the interface server 304. In accordance with one embodiment, when an email is received by interface server 304, a determination is made (e.g., by extension 305) as to whether the email or any attachment is protected by the DRM system. This can be done in any manner. In one embodiment, extension 305 directly determines whether the email or any attachment is protected by the DRM system. This can be done by looking at the structure of the content or metadata associated with it. In another embodiment, the extension may query the DRM server 302 as to whether the content is registered. The DRM server 302 may determine whether the email is registered as protected content in any suitable manner (examples of which are discussed below), and send a response back to the extension 305 on the interface server 304.

When it is determined that the content is not protected, the content is passed to the access device 306 as usual in the manner in which the remote email system conventionally operates, without intervention by the DRM system. When it is determined that the content is protected, the interface server 304 communicates with (as shown by arrows 312 and 314) the DRM server 302 to obtain the access information for the content. It should be appreciated that this may be done in any way. For example, when the DRM server 302 determines that the content for which it received the query is registered, the DRM server may automatically return the associated access information to the interface server.

Thus, in concert with the interface server 304, the extension 305 gathers access information for content on the content server 308 that is determined both to be directed to a constrained device and protected by the DRM system. The extension 305 retrieves, from the DRM server 302, information that the access device 306 can use to access the protected content and enforce any DRM policy specified for it, and transfers that information to the access device 306. This information can take any suitable form, and may vary depending on the type of information used by the DRM system.

This information can be sent to the access device 306 in any suitable way. In one embodiment, the content is held until after the access information associated with it has been retrieved, and then the access information is inserted into a header and sent along with the content. Alternatively, the access information can be sent separately from the content.

Steps can be taken to ensure that the access information is transmitted securely to the access device so that only the intended user can access it. This can be done in any suitable manner. In one embodiment for use with a remote email access system, a unique key is established for each remote wireless access device and stored by its plugin 307, and the access information is encrypted in a manner that it can only be decrypted with the unique key. This unique key is referred to herein as a shared key, since in some embodiments, the key is shared by the access device and the DRM server.

In addition to the access policy, the access information also includes a content key (also referred to as a message key when the content is an email message) that can be used to decrypt the protected content if the desired access is allowed by the policy. The content key is created when the content is registered to the DRM system, and may be retained by the DRM server.

In one embodiment, the access information can include a mechanism to establish a new shared key for decryption of future transmissions of the access information to the access device. This can be done in any way. In one embodiment, information is provided to enable the access device to generate a new shared key. In another embodiment, a new shared key itself is provided. The provision of a mechanism to establish a new key can provide increased security by not relying solely on an original shared key established when the plugin is installed. However, mechanism to update the shared key need not be provided in all embodiments, and the original shared key can be used to decrypt all access information.

In some embodiments, the access information includes information establishing an expiration event, wherein access to the content via the access device is denied after a triggering of the expiration event. In one embodiment, the expiration event comprises a specified time period and the triggering of the expiration event includes a lapse of the specified time period. Such a specified time period therefore defines an expiration time limit beyond which access to the content is prohibited. This feature is described in more detail below, and is optional, as an expiration time limit need not be provided with content units in all embodiments.

Content received by the interface server 304 from the content server 308 may be sent (arrows 316 and 316') to the destined access device 306. In the illustrative remote email access system shown, the gateway 309 acts as an intermediary between the interface server 304 and the access device 306, and enables wireless communication with the access device 306. However, the techniques described herein are not limited to use with a system that employs a gateway to facilitate communication with the access device. It should also be appreciated that content may be sent to the interface server 304 in any manner other than being sent from a content server, as the techniques described herein are not limited in this respect.

Content may include embedded links (e.g., URL links to one or more websites) to further pieces of the content. In the remote email access system example, the interface server may retrieve information that the embedded links point to and send it along with the protected content.

As discussed below, in some embodiments, the content unit and the associated access information may be sent as a modified content unit including the access information and the content. For example, in embodiments where the content unit includes a protected email message, a modified email message may be sent to the access device 306, where the modified email message includes the protected email message and a header comprising the access information. In other embodiments, the access information may be sent separately from the protected email message. Irrespective of whether the access information is sent to the access device 306 bundled with the protected message or separately, the access information may be sent in a secure manner (e.g., encrypted as discussed above).

In one embodiment, the access information is sent automatically to the access device 306, without a request for the access information (or even a request for access to the associated content) having to be issued by the access device 306. Such proactive transmission of the access information associated with protected content to an access device 306 may be particularly beneficial in situations where the access device is a constrained device. In such situations, the access device may not be able to connect to the network when access to the protected content is desired by a user (e.g., a Blackberry user may seek to access protected email while on a plane with no network connectivity available). When the access information was proactively sent to the access device with the associated protected content at any time, the user can access the protected content, even if connectivity to the network is not available.

Once the content is received by the access device, the protected content may be held on the access device 306 in a way so as to prevent it from being accessed except under control of the plugin 307, thereby ensuring that the protected content is not accessed in a manner inconsistent with its DRM policy. This can be done in any suitable way. In accordance with one embodiment, plugin 307 can enforce the DRM policy to control access to the protected content in any of the ways employed by the DRM system (examples of which are described above). For example, the plugin can grant authorized access requests, deny unauthorized requests, and render watermarks when called for by the DRM policy. Also, the plugin 307 may prevent the launching of applications on the access device that provide various capabilities, only some of which may be authorized by the DRM policy for a particular protected content unit. For example, an email application may enable the user to not only view an email, but to cut and paste content into another new email (or other document type) that may be outside of the scope of the DRM system. Thus, to preclude a user from launching an application that may potentially allow a user to perform an unauthorized act (e.g., a copy), in one embodiment, the DRM plugin replicates such applications but in a manner controlled by the DRM plugin. For example, when the user attempts to launch an email viewing application, the plug-in may detect this request and instead launch a replicated application (referred to herein as a restricted functionality viewing application) that provides the user with essentially the same experience and functionality, except that unauthorized actions (e.g., copying into a new email) can be detected and prevented by the plug-in. The email viewing application is just one example, as any type of application can be replicated with restricted functionality.

As previously mentioned, the above discussed functionality that provides access to protected content on a constrained device can be implemented in any suitable way, as the embodiments are not limited to any particular implementation techniques. Examples of processes to implement this functionality will be discussed below. It should be appreciated that these are simply illustrative examples and other implementation techniques can be used.

Figure 4:
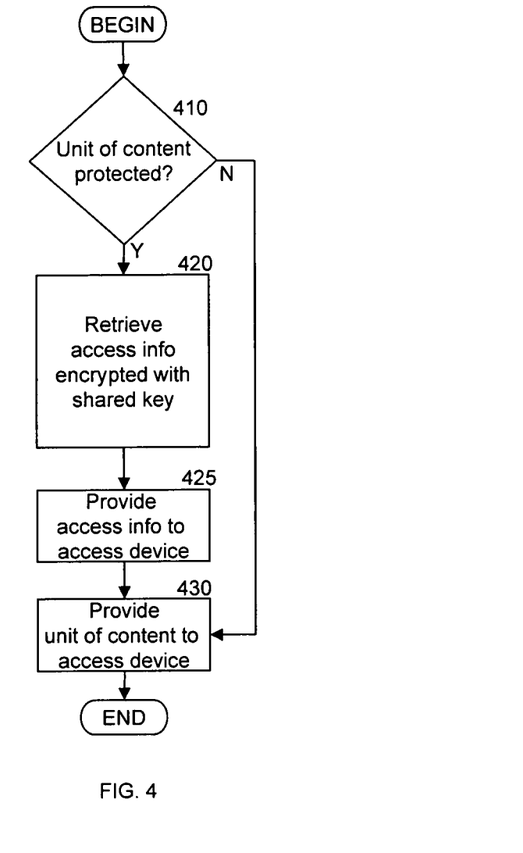
FIG. 4 is a flowchart of a process for managing a protected unit of content and associated access information in accordance with one embodiment.

FIG. 4 is a flowchart of an illustrative process for managing a protected unit of content and associated access information in accordance with one embodiment. The method may be used in a computer system comprising a DRM system that manages access information associated with protected units of content.

When implemented in a system such as that shown in FIG. 3, the process illustrated in the flowchart of FIG. 4 may be performed by the interface server 304. Alternatively, the process of FIG. 4 could be performed on content server 308 (e.g., a system that does not employ an interface server) or elsewhere. Also, it should be appreciated that the process need not be performed on solely one server, and can be distributed amongst multiple computers in the system.

The process of FIG. 4 may be called to process a unit of content for which a determination has been made that it is to be transmitted to an access device having constrained connectivity. That determination can be done in any way, as the process is not limited in this respect. In the remote email access system of FIG. 3, the interface server 304 is programmed to only select emails intended for access via the constrained access device 306 (e.g., emails intended for a user having a remote email access device may be extracted from the email exchange server and identified as intended for that user). Thus, all of the content units on the interface server have already been determined to be destined for the constrained access device, so that the process (e.g., performed by the extension 305 in the system of FIG. 3) can handle each of the emails selected by the interface server 304. Of course, the embodiments are not limited to such an implementation, as the content intended for transmission to a constrained access device can be determined in other ways. In other embodiments, a determination may first be made as to whether the access device to which the content is destined is a constrained connectively access device. This can be done in any suitable way, as the process is not limited in this respect. For example, not all systems may have an interface server that extracts content from a content server to be sent to a constrained access device (e.g., the content may be sent directly from the content server), so that the determination can be made by portions of the system other than an interface server. In one embodiment, if the access device to which the content will be sent is not a constrained device, the content is sent along without any further processing. However, the process is not limited in this respect, because as discussed below, the techniques described herein can be used with content intended for non-constrained devices in some embodiments.

The process begins with act 410, wherein a determination is made as to whether the unit of content that is to be transmitted to an access device is protected by the digital rights management system (act 410). This determination can be made in any suitable way, as the process is not limited in this respect. As discussed above, this can be done by the extension 305 (e.g., either directly or by querying the DRM server to see if the unit of content is registered as protected).

If it is determined that the unit of content is not protected by the DRM system, the content may be provided to the access device (act 430) without the addition of any access information. Optionally, as previously described, if links (e.g., URL links) are present in the unit of content, the interface server may collect and combine linked information and also send it to the access device. As discussed below, this action optionally may also be performed when it is determined that the unit of content is protected.

If it is determined at act 410 that the unit of content is protected by the DRM system, access information associated with the protected content may be retrieved (act 420). The access information may be retrieved in any suitable manner, as the process is not limited in this respect. In one embodiment, access information is retrieved by sending a request to the DRM server that manages (and either stores or has access to) the access information associated with the protected content. The request for the access information may identify the protected content in any suitable way (e.g., using a unique identifier associated with the protected content, as discussed above) and/or may identify the access device and/or user to which the protected content is destined. In one embodiment, it is contemplated that the access device's access permissions may be the same for a particular user and/or a particular type access device, so that the identification of specific content units may be unnecessary because the permissions for all will be the same. However, in other embodiments the permissions may vary by content unit. In one embodiment, the request for access information and the query of the DRM server to determine if the content unit is protected can be combined so the DRM server can automatically return access information for a content unit in response to a query for whether it is protected. Alternatively, these requests for information can be made separately.

The DRM server may process the request for the access information associated with the protected content and securely send the access information to the interface server in any suitable way. As discussed above, the DRM server may associate access information with a unique identifier for a content unit, and can retrieve the appropriate access information in response to receipt of the identifier, but this is merely one example as the DRM server can retrieve the appropriate access information in other ways.

As discussed above, in one embodiment the access information may be encrypted by the DRM server based on a shared encryption key unique to the access device to which the protected content is destined. In this embodiment, the encryption may be performed by the DRM server and the interface server may simply pass along the encrypted access information to the access device. Alternatively, a first encryption may be performed between the DRM server and the interface server so that the access information may be securely sent to the interface server, and then the interface server may decrypt and then re-encrypt the access information for transmission to the access device.

The protected content and the associated access information are provided to the access device in acts 425 and 430, and the process terminates. As mentioned above, the access information and the protected content may be provided to the access device as a modified content unit including the protected content bundled with the associated access information, or the access information may be provided separately from the protected content unit in any order.

Figure 5:
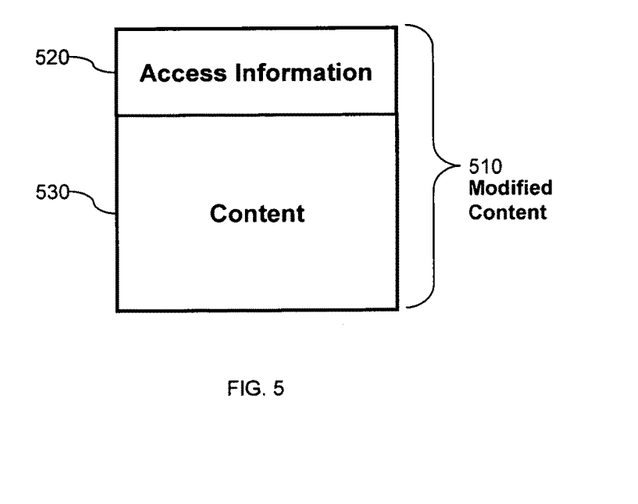
FIG. 5 is a schematic representation of a modified content unit including access information and associated protected content that can be generated in accordance with one embodiment.

FIG. 5 is a schematic representation of a modified content unit 510, including access information bundled in a header 520 with associated protected content in a body 530, that can be created in accordance with one embodiment.

As discussed above, in one embodiment, the access information may include a content key to decrypt the encrypted unit of content (i.e., the content key created when the content unit was registered with the DRM server), DRM policy information that specifies the manner in which the unit of content can be accessed, an expiration time limit establishing a time period during which access to the unit of content can be achieved via the access device without returning to the DRM server, and/or a mechanism to establish a new shared key for decryption of future access information by the access device. As stated above, the access information can take numerous other forms and is not limited to including this particular information. For example, the expiration time limit and new key for future accesses each is optional, as discussed above.

Figure 6:
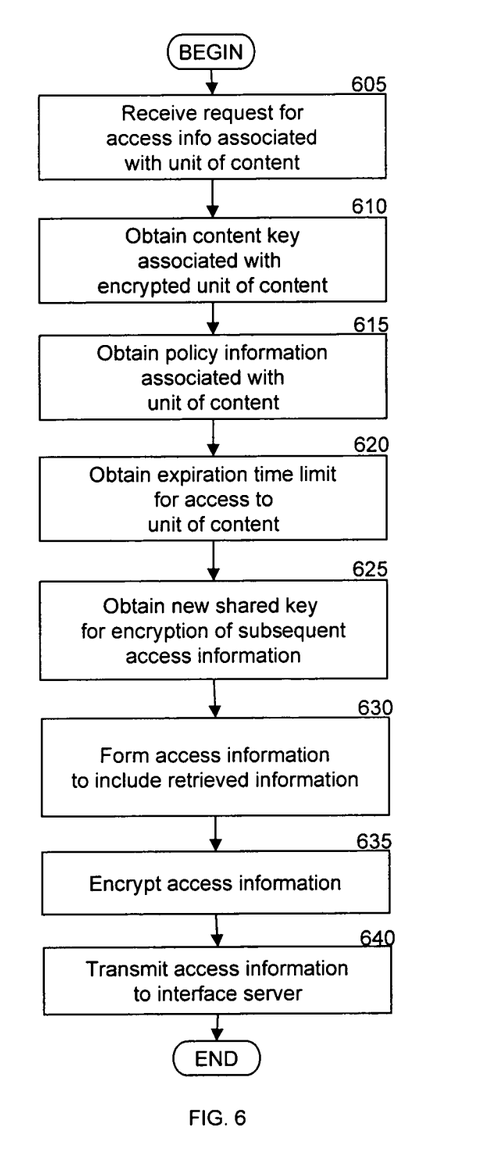
FIG. 6 is a flowchart of a process for generating access information associated with a protected unit of content in accordance with one embodiment.

FIG. 6 is a flowchart of an illustrative process for generating the type of access information discussed above. This particular process is merely illustrative, as the generation of the access information can be done in any suitable way, and will vary depending on the type of access information to be provided. In one embodiment, the process may be performed by the DRM server, and may be performed in response to a request (e.g., from extension 305 in the embodiment of FIG. 3) for access information associated with a unit of protected content destined for an access device, although other implementations are possible.

The process begins by receiving a request for access information associated with a protected unit of content (act 605). The request may take any suitable form, as the process is not limited in this respect. For example, the request may identify the protected content unit for which access information is desired (e.g., by the unique identifier generated for the content unit when it was registered to the DRM system or otherwise). The request may also include an indication of the specific access device (or type of access device) and/or the user to which the protected content is destined. Such indications may be provided in any suitable way. The access device and/or user information optionally may be used to tailor the access information to be provided, as the DRM policy may vary depending on the access device and/or user. In addition, in the embodiments wherein the access information is encrypted on the DRM and passed through to the access device (without being decrypted and re-encrypted by the extension 305 of FIG. 3), tailoring of the access information may include encrypting the access information using a shared key that will enable decryption by the access device to which the information will be sent.

In act 610, the content key that is associated with the protected content and which may be used by the access device to decrypt the protected content is obtained. In one embodiment, the content key is created when the protected content was encrypted and registered to the DRM system. The retrieval of the content key can be done in any way, as the process is not limited in this respect. For example, the identification of the protected content received in act 605 may be used to retrieve the content key associated with the indicated content unit. The association of content keys with associated protected units of content may be achieved in any suitable way. For example, a look-up table and/or database may be used by the DRM to store a mapping of content keys to associated protected units of content. The mapping may be stored on the DRM server or a secure storage medium accessible to it. It should be understood that these are just some possible examples, and that the association may be done in other ways.

Policy information associated with the unit of content may be obtained at act 615. As discussed above, in one embodiment policy information may be defined based solely on the identity of the content unit, solely on the identity of the device and/or solely on the identity of the user, or may factor in two or more of these pieces of information. The policy information can be obtained in any suitable way. For example, the DRM server may use a mapping in much the same way as a mapping may be used to obtain the content key. In one embodiment, all information to be retrieved may be stored together by the DRM server so that it can be accessed as a unit, or each piece of information may be accessed separately.

In the embodiments where an expiration time is associated with the protected unit of content to limit access to it, the expiration time limit may be retrieved in act 620. The expiration time limit may have been specified when the policy was created by the DRM and may be retrieved (e.g., in much the same manner as the other components of the access information). Alternatively, the expiration time may be created later based on any suitable criteria. In one embodiment, it can be generated in response to a request to access a content unit on a constrained device, and may be generated based on any suitable criteria (e.g., the identity of a user and/or access device, etc.).

In embodiments where a mechanism to establish a new shared key is provided to the access device to decrypt future transmissions of access information, a new shared key may be obtained (e.g., generated and/or retrieved) in act 625. When retrieved, the new key can be retrieved in any suitable manner (e.g., in much the same manner as the other components of the access information). When generated, any suitable technique can be employed, as the process is not limited to any implementation technique. The new shared key may be generated by the DRM server, the extension on the interface server (so that it need not be obtained by the DRM server and transmitted to the interface server), or by any other component in the computer system.

Some or all of the obtained access information (e.g., obtained at acts 610, 615, 620, and/or 625) may be appended together (act 630), or may be maintained separately. The access information thus may contain a content key (i.e., decryption information to decrypt the protected content), policy information associated with the protected content destined for the access device, and optionally additional information.

The access information may be encrypted (e.g., using the shared key that is known by the DRM server and the access device) at act 635 to ensure secure transmission through the system to the access device. The encrypted access information is transmitted to the interface server at act 640 (which in turn may then forward the access information to the access device as described previously in relation to the process of FIG. 4), and the process then ends.

Figure 7:
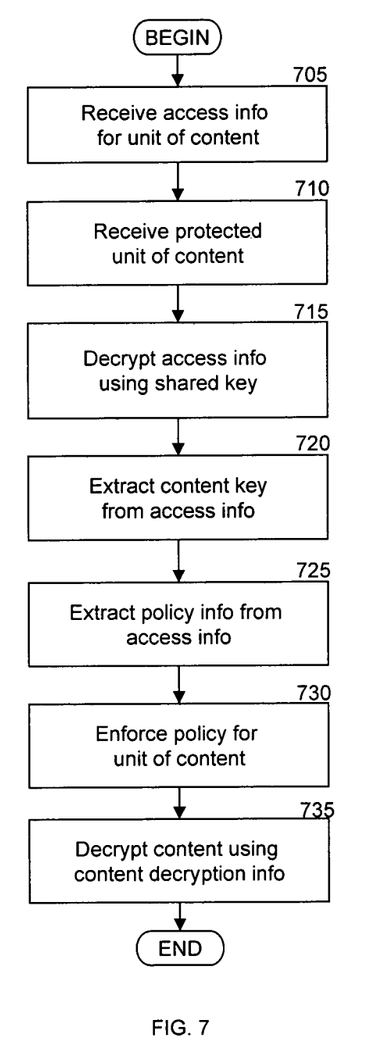
FIG. 7 is a flowchart of a process for using access information to access an associated protected unit of content in accordance with one embodiment.

FIG. 7 is a flowchart of a process for using access information associated with a protected unit of content on a constrained access device to enable the constrained device to access the protected unit of content and enforce the DRM policy associated with it. The process of FIG. 7 may be performed by the access device. In one embodiment, the process is executed by a DRM plugin on the access device, such as the plugin 307 in FIG. 3. However, the process is not limited in this respect, and may be executed in part or whole by one or more other components in the system.

In one embodiment, the process receives access information for a protected unit of content at act 705 and receives the protected unit of content at act 710. As previously described, the access information and protected content may be bundled together and received as a modified unit of content, or they may be received separately in any order. As discussed above, the received access information may have been encrypted (e.g., with a shared key that is known to the access device and the DRM server) to ensure secure transmission to the access device. Additionally, or alternatively, the access information may also be encrypted using a communication session key negotiated for a communication session between the interface server and the access device. In act 715, the process decrypts the access information, for example, using the shared key. Once decrypted, the information within the access information may be extracted and used.

In one embodiment, the protected unit of content was encrypted using the content key established when the content unit was registered to the DRM system. The content optionally may have been further encrypted using a communication session key between the interface server and the access device. As discussed above, in one embodiment, the access information decrypted in 715 includes the content key that can be used to decrypt the content unit. After the access information is decrypted, the process can extract the content key from the access information in act 720. The content key can then be used to decrypt the protected unit of content, as discussed further below. This protection scheme is just an example, and other techniques are possible for ensuring the secure transmission of the access information and protected content to the access device.

Policy information may also be extracted from the access information at act 725, and may be used to enforce the access policy associated with the protected unit of content at act 730, as discussed below. If access to the protected content is allowed by the policy information, then the content key may be used to decrypt the protected unit of content at act 735, and the decrypted content may be presented to the user.

Any other information in the access information may also be extracted (not shown in FIG. 7). For instance, an expiration time limit may be extracted from the access information and used to prevent access to the protected unit of content after the time limit has expired. The expiration time limit can be a certain specified amount of time (e.g., a specified time measured from the initial receipt of the access information), can be dependent on the occurrence of a specified event, or can be defined in any other suitable manner.

As discussed above, in one embodiment the access information may also include a mechanism to establish a new shared key which will be used to decrypt one or more subsequent access information transmissions received at this specific access device. In this manner, the shared key may be changed in a secure manner, since the mechanism to establish the new shared key is included within the encrypted access information.

It should be understood that the additional information (e.g., expiration time and new shared decryption key) is optional and need not be provided. Also, other types of additional information may additionally, or alternatively, also be included, as the techniques described herein are not limited to use in DRM systems that employ any type of additional DRM information.

In some embodiments, when a user attempts to access the protected content using the access device, the DRM plugin on the access device may be invoked to ensure that the protected content is used in a manner consistent with its DRM policy. The plugin and/or an associated viewing program may ensure that the policies associated with the protected content are adhered to. For instance, a user may only be allowed to copy, cut, save, modify, and/or print the content in accordance with the polices associated with the protected content. When an expiration time is provided (which may have been sent in the access information), the plugin may deny any access to the protected content after the expiration time has elapsed.

In some embodiments, access information may include a specification that a user of the access device be authenticated using-a specified authentication technique. The specified authentication technique may involve a password being provided that meets at least one specified criterion (e.g., has a specified length, for example, a specified number of bits). In some embodiments, a policy associated with a protected content unit may require that the user be authenticated at the access device each time the user attempts to access the protected content. The plugin on the access device may prompt the user for authentication credentials and authenticate the user. This can be done any way. In one embodiment, the plugin performs the authentication locally (e.g., by comparing authentication credentials, which may include a password, to previously provided authentication credentials). Alternatively, the plugin may establish a communication channel back to an application capable of performing authentication, and pass along the credentials for authentication. If authentication fails, the plugin on the access device may not access the protected content.

As mentioned above, in one embodiment, when a user attempts to access a protected unit of content using a particular "at risk" application on the accessing device that might enable an action to be performed that could take protected content outside the control of the DRM scheme (e.g., copying email content into a new unprotected email), a DRM-controlled counterpart application may be launched by the DRM plugin to present the content to the user under the control of the DRM system, so that its use can be controlled consistently with the access policy. The accessing of the content may involve the plugin accessing the protected content, checking associated polices and presenting the content to the user with the DRM-controlled application. The launching of the DRM-controlled application may occur automatically. For example, when a user seeks to access a protected content unit via an application, the counterpart DRM-controlled application may be launched in a manner transparent to the user. Alternatively, when the user seeks to access a protected content unit via an "at risk" application, a menu item may be provided to the user so that the user can choose to launch the counterpart DRM-controlled application to gain access to the protected content.

As discussed above, in one embodiment a time limit is placed on the access of content. This may be done for any desired reason. However, in some embodiments, no such time limit can be imposed, or a user/system administrator may choose not to impose one. If there is no time limit (and perhaps even if there is), it may be desired to ensure that the DRM policy for a protected content unit has not changed subsequent to the time it was sent to the remote access device. Thus, in one embodiment, the DRM server may be periodically interrogated to determine whether changes have been made to any of the policies of the protected content units on the access device. This can be done in any suitable way, as the embodiments are not limited to any particular implementation technique. For example, the plugin on the access device may establish a communication channel back to the DRM server to retrieve policy updates for protected content units held on the access device. If the DRM server indicates that access to the protected content has expired, been revoked, and/or altered, the plugin on the access device may prevent access to it (e.g., by deleting its copy of the protected content or revising its policy information) so that the content may no longer be viewed on the access device. If the plugin on the access device is unable to communicate with the DRM server at an established "check back" time, it may deny access to the protected content unless and until it is able to verify that it has the up-to-date DRM policy. It should be appreciated that this check back feature is optional and need not be employed in all embodiments.

As another example, the DRM server may be configured so that if a policy associated with protected content is modified, the DRM server may establish a communication channel with the plugin on the access device holding the protected content and proactively update the policy information on the access device.

Communication between the DRM server and the access device for check backs and/or updated policy information may occur directly (e.g., arrow 321 in the system of FIG. 3), or via the interface server (e.g., arrows 320 in the system of FIG. 3).

It should be appreciated that as used herein, a constrained device refers to a computing device that relies on a network connection to the DRM system that is so unreliable, slow, or of such high latency to cause a poor user experience. Examples of such devices include those that rely almost exclusively on wireless connections such as cell phones, PDAs, email messaging devices, and/or pagers. In some embodiments, the accessing device is considered to be constrained if the network connectivity is commonly unavailable, so slow, and/or of such high latency, such that communicating the access information at the time of access would cause a delay greater than 10 seconds, although delays of greater than 20 seconds, greater than 40 seconds, and greater than 60 seconds are possible. In some embodiments, network connectivity is considered to be commonly unavailable if the connectivity is unavailable more than 20% of the time access to it is sought, although unavailability of more than 30%, more than 40%, or more than 50% are possible.

It should be appreciated that the techniques described herein can be used with wireless access devices of any type. A wireless access device may include a wireless communication interface that can enable wireless communication (e.g., with a network gateway as described in the example above or with any other device capable of wireless communication). The wireless communications interface can be implemented in any suitable manner, as the techniques described herein are not limited to wireless access devices that are implemented using any particular type of wireless communications interface. The wireless access device may also include one or more processors that may be programmed to receive and process content received via the wireless communication interface in any suitable manner, and that may be further programmed (e.g., via a plug-in as discussed above in some embodiments) to perform the techniques described herein. A wireless access device may also include a user interface that can enable a user to interact with the wireless device (e.g., by viewing content, creating content, etc.). The user interface can take any form (e.g., a keyboard, a display screen, a speaker, a scroll bar, a touch screen and/or any other interface mechanism that enables interaction with a user) as the techniques described herein are not limited to use with wireless devices having any specific type of user interface.

Although the techniques described herein facilitate the use of constrained access devices with DRM systems, it should be appreciated that in some embodiments the access device is not limited to be a constrained device, as techniques described herein may also be used advantageously in conjunction with non-constrained access devices. In this respect, proactively sending access information to an access device along with protected content before the user requests access to the content may improve user interaction with the DRM system in some systems, even where the network connectivity of the access device is not constrained. The access information will be on the access device and immediately available for use in response to the user initiating access the protected content. This may result in a reduction in the amount of time needed to access the protected content, as compared to conventional DRM systems wherein access information is obtained from the DRM server in response to a request to access the protected content.

As should be appreciated from the foregoing, numerous techniques described herein can be used independently of one another. Thus, while in some embodiments all of the above-described features can be used together, any combination or subset of the features described above can be employed together in a particular implementation, as the aspects of the present invention are not limited in this respect.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

It should be appreciated that the various processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, it should be appreciated that one embodiment of the invention is directed to a computer-readable medium or multiple computer-readable media (e.g., a computer memory, one or more floppy disks, compact disks, optical disks, magnetic tapes, etc.) encoded with one or more programs that, when executed, on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing, and the aspects of the present invention described herein are not limited in their application to the details and arrangements of components set forth in the foregoing description or illustrated in the drawings. The aspects of the invention are capable of other embodiments and of being practiced or of being carried out in various ways. Various aspects of the present invention may be implemented in connection with any type of network, cluster or configuration. No limitations are placed on the network implementation.

Accordingly, the foregoing description and drawings are by way of example only.

Also, the phraseology and terminology used herein is for the purpose of description and should not be regarded as limiting. The use of "including," "comprising," or "having," "containing," "involving," and variations thereof herein, is meant to encompass the items listed thereafter and equivalent thereof as well as additional items.

What is claimed is:

1. A method for implementing a digital rights management ("DRM") system on a wireless device connected to a wireless network, the method comprising:

receiving, by an interface server, a plurality of content units, the plurality of content units comprising unprotected content and at least one protected content unit from a content server, the plurality of content units being designated for the wireless device, the content server being external to the interface server;

determining, by the interface server, that the at least one protected content unit is protected by querying a digital rights management (DRM) server as to whether the received plurality of content units are registered, the DRM server being external to the interface server;

requesting, by the interface server, access information for the at least one content unit from the DRM server in response to the determining that the at least one protected content unit is protected;

receiving, by the interface server, the requested access information; and transmitting, by the interface server, the access information for the at least one protected content unit to the wireless device without the wireless device requesting access to the at least one protected content unit, the transmitting the access information being in response to the determining that the at least one protected content unit is protected.

2. The method of claim 1, wherein the access information comprises policy information for the at least one content unit and a decryption key for accessing the at least one content unit on the wireless device.

3. The method of claim 1, wherein the access information comprises a decryption key for decrypting access information for at least one content unit transmitted to the wireless device in a subsequent transaction.

4. The method of claim 1, wherein the at least one content unit is an email message, and the at least one content unit and access information for the at least one content unit is automatically transmitted to the wireless device by the interface server whenever the wireless device connects to the interface server to download the email message.

5. A computer program product, comprising a non-transitory computer-readable medium having computer readable program code embodied therein, the computer readable program code comprising instructions that, when executed by one or more processors of an interface server, cause the interface server to perform a method comprising:

receiving, by the interface server, a plurality of content units, the plurality of content units comprising unprotected content and at least one protected content unit from a content server, the plurality of content units being designated for the wireless device, the content server being external to the interface server;

determining, by the interface server, that the at least one protected content unit is protected by querying a digital rights management (DRM) server as to whether the received plurality of content units are registered, the DRM server being external to the interface server;

requesting, by the interface server, access information for the at least one content unit from the DRM server in response to the determining that the at least one protected content unit is protected;

receiving, by the interface server, the requested access information; and transmitting, by the interface server, the at least one protected content unit and the access information for the at least one content unit to the wireless device without the wireless device requesting access to the at least one protected content unit, the transmitting the access information being in response to the determining that the at least one protected content unit is protected.

6. The computer program product of claim 5, wherein the access information comprises policy information for the at least one content unit and a decryption key for accessing the at least one content unit on the wireless device.

7. The computer program product of claim 5, wherein the access information comprises a decryption key for decrypting access information for at least one content unit transmitted to the wireless device in a subsequent transaction.

8. The computer program product of claim 5, wherein the at least one content unit is an email message, and the at least one content unit and access information for the at least one content unit is automatically transmitted to the wireless device by the interface server whenever the wireless device connects to the interface server to download the email message.

9. An interface server for implementing a digital rights management ("DRM") system on a wireless device connected to a wireless network, the interface server comprising:

one or more processors; and a non-transitory computer readable medium storing a plurality of instructions that, when executed by the one or more processors, cause the one or more processors to perform a method comprising:

receiving a plurality of content units, the plurality of content units comprising unprotected content and at least one protected content unit from a content server, the plurality of content units being designated for the wireless device, the content server being external to the interface server;

determining that the at least one protected content unit is protected by querying a digital rights management (DRM) server as to whether the received plurality of content units are registered, the DRM server being external to the interface server;

requesting access information for the at least one content unit from the DRM server in response to the determining that the at least one protected content unit is protected;

receiving the requested access information; and transmitting the at least one protected content unit and the access information for the at least one content unit to the wireless device without the wireless device requesting access to the at least one protected content unit, the transmitting the access information being in response to the determining that the at least one protected content unit is protected.

10. The interface server of claim 9, wherein the access information comprises policy information for the at least one content unit and a decryption key for accessing the at least one content unit on the wireless device.

11. The interface server of claim 9, wherein the access information comprises a decryption key for decrypting access information for at least one content unit transmitted to the wireless device in a subsequent transaction.

12. The interface server of claim 9, wherein the at least one content unit is an email message, and the at least one content unit and access information for the at least one content unit is automatically transmitted to the wireless device by the interface server whenever the wireless device connects to the interface server to download the email message.

* * * * *